(12) United States Patent
Manabu et al.

(10) Patent No.: US 9,214,847 B2
(45) Date of Patent: Dec. 15, 2015

(54) MOTOR, AND MOTOR PRODUCTION METHOD

(75) Inventors: Kitamura Manabu, Miyoshi (JP); Atsushi Watanabe, Toyota (JP); Takashi Yamada, Toyota (JP); Shingo Hashimoto, Okazaki (JP); Yoshiyuki Kawasaki, Takahama (JP); Kiyotaka Koga, Nishio (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 386 days.

(21) Appl. No.: 13/581,735

(22) PCT Filed: Jul. 20, 2010

(86) PCT No.: PCT/JP2010/062137
§ 371 (c)(1),
(2), (4) Date: Aug. 29, 2012

(87) PCT Pub. No.: WO2011/132328
PCT Pub. Date: Oct. 27, 2011

(65) Prior Publication Data
US 2012/0319523 A1    Dec. 20, 2012

(30) Foreign Application Priority Data
Apr. 19, 2010  (JP) .................................. 2010-095759

(51) Int. Cl.
*H02K 3/00* (2006.01)
*H02K 15/04* (2006.01)
(52) U.S. Cl.
CPC ....... *H02K 15/0464* (2013.01); *Y10T 29/49009* (2015.01)

(58) Field of Classification Search
CPC . Y10T 29/49009; H02K 3/00; H02K 15/0464
USPC ................................................... 310/207, 208
See application file for complete search history.

(56) References Cited

U.S. PATENT DOCUMENTS

| 2006/0066167 A1* | 3/2006 | Saito et al. ..................... 310/201 |
| 2009/0261681 A1* | 10/2009 | Taguchi ......................... 310/198 |

(Continued)

FOREIGN PATENT DOCUMENTS

| JP | 2000-278903 A | 10/2000 |
| JP | 2001-045688 A | 2/2001 |
| JP | 2002-051489 A | 2/2002 |
| JP | 2006-121817 A | 5/2006 |
| JP | 2008-167567 A | 7/2008 |
| JP | 2009-044901 A | 2/2009 |

(Continued)

OTHER PUBLICATIONS

International Search Report of PCT/JP2010/062137 mailed Aug. 24, 2010.

*Primary Examiner* — Terrance Kenerly
(74) *Attorney, Agent, or Firm* — Kenyon & Kenyon LLP

(57) ABSTRACT

Provided is a motor comprising: a stator equipped with a coil basket, which is a distributed winding coil that uses flat wire, and a stator core; and a rotor with a central shaft. The motor is characterized in that: the coil end at one end of the coil basket has bent sections that are bent on the rotor side in relation to wire sections inside slots of the stator core; and a lower-side concentric section and horizontal sections, which comprise the coil end at the other end, are positioned further toward the shaft center side of the rotor than the inner peripheral surface of the teeth; and the coil end at one end and the coil end at the other end comprise five flat wires that are lap wound in a flatwise direction.

5 Claims, 21 Drawing Sheets

(56) References Cited

U.S. PATENT DOCUMENTS

| | | | |
|---|---|---|---|
| 2010/0102681 A1* | 4/2010 | Koga et al. | 310/68 B |
| 2010/0187938 A1* | 7/2010 | Yamamoto et al. | 310/195 |
| 2010/0289374 A1* | 11/2010 | Koga et al. | 310/195 |
| 2012/0007460 A1* | 1/2012 | Kitamura et al. | 310/195 |
| 2012/0181891 A1* | 7/2012 | Yamada et al. | 310/201 |

FOREIGN PATENT DOCUMENTS

| | | |
|---|---|---|
| JP | 2010-081771 A | 4/2010 |
| JP | 2010-104145 A | 5/2010 |
| WO | 92/01327 A1 | 1/1992 |
| WO | 2004/062065 A1 | 7/2004 |
| WO | 2010/007950 A1 | 1/2010 |

* cited by examiner

MOTOR, AND MOTOR PRODUCTION METHOD

CROSS-REFERENCE TO RELATED APPLICATIONS

This is a 371 national phase application of PCT/JP2010/062137 filed on Jul. 20, 2010, which claims priority to Japanese Patent Application No. 2010-095759 filed Apr. 19, 2010, the entire contents of which are incorporated herein by reference.

FIELD OF THE INVENTION

The present invention relates to a motor including a stator provided with a distributed winding coil made of a flat rectangular wire and a stator core, and a rotor having a central shaft.

BACKGROUND OF THE INVENTION

It is difficult to insert a distributed winding coil made of a flat wire having a rectangular cross section of, for example, about 1 mm×about 10 mm into slots of a stator core. Because such a flat wire has rigidity and is hard to deform, different from a round wire. To solve this problem, various proposals have been made.

Patent Document 1 proposes to appropriately design the width of a wire and the inclination angle of a coil in order to easily insert the coil made of a wound wire, from inside to outside in a radial direction, into slots formed between teeth parts.

On the other hand, Patent Document 2 discloses a coil insertion method in which a wire to be inserted in the slots is lap-wound to form a coil, this coil is set in an inserting jig, the jig is put in the stator core, and the coil is inserted into the slots of the stator core from the inserting jig.

Patent Document 3 discloses a distributed winding coil having an insertion leading end portion bent toward an axis.

RELATED ART DOCUMENTS

Patent Documents

Patent Document 1: JP 2002-051489A
Patent Document 2: JP 2008-167567A
Patent Document 3: WO 92/01327

SUMMARY OF THE INVENTION

Problems to be Solved by the Invention

However, the conventional method of inserting the coil into the stator core has the following disadvantages.

Specifically, as disclosed in Patent Document 1, the method of individually inserting coils has to repeat an inserting work by the number of times corresponding to the number of teeth parts. Thus, the inserting work takes long time. Furthermore, the inserting device has a complicated structure leading to an increased size.

In the case of using the inserting jig as in Patent Document 2, even when the inserting work is completed well, the coil(s) elastically deformed in the inserting jig is apt to be deformed due to spring back after the coil(s) is inserted in the slots. This may cause a part of the wire to protrude out of the slot(s).

Both Patent Documents 1 and 2 in which the coils are inserted into the teeth slots from inside to outside in a radial direction have the above disadvantages. Therefore, the present inventors conceived that the above problems were solvable if the coils could be inserted into the slots in an axial direction.

In the case of a concentrated winding coil, when an insertion leading end portion of the coil is bent toward a central axis, remaining portions are easily inserted in slots. However, in the distributed winding coil, a portion to be bent has a complicated shape and is hard to bend.

Patent Document 3 discloses a technique to bend an insertion leading end portion of the concentrated winding coil. However, in this technique of Patent Document 3, a plurality of wires bent at different points are individually produced and assembled together, needing a long time for production, resulting in high cost.

The present invention has been made to solve the above problems and has a purpose to provide a low-cost motor in which a distributed coil made by winding a flat rectangular wire is easily inserted in slots along an axial direction.

Means of Solving the Problems

To achieve the above purpose, one aspect of the invention provides a motor and a motor production method has the following configurations.
(1) A motor includes: a stator provided with a distributed winding coil formed of a flat wire and a stator core; and a rotor provided with a central shaft, wherein the coil has a coil end part at one end bent toward the rotor side with respect to an in-slot wire part of the stator core, the one-end coil end part is located closer to an axis of the rotor than an inner peripheral surface of the stator core, and the one-end coil end part and a coil end part at the other end are each formed of a plurality of portions of the flat wire wound flatwise in overlapping relation, the one-end coil end part is formed in a concentric semicircular shape, and the other-end coil end part is formed in a concentric semi-circular shape, a pair of terminals protrude outward from both sides of the other-end coil end part formed in the concentric semi-circular shape, and the terminals are overlapped on a terminal of an adjacent coil in an axial direction of the rotor.
(2) In the motor described in (1), preferably, in the one-end coil end part, the portions of the flat wire placed in adjacent slots are overlapped one on another in a radial direction of the rotor, and in the other-end coil end part, the portions of the flat wire placed in adjacent slots are overlapped one on another in an axial direction of the rotor.
(3) In a motor production method for a motor including: a stator provided with a distributed winding coil formed of a flat wire and a stator coil; and a rotor provided with a central shaft, there are included: a first step of winding the flat wire in overlapping relation by placing flatwise portions of the flat wire in contact with each other; a second step of bending a coil end part at one end of the distributed winding coil toward the rotor side with respect to an in-slot wire part, and a third step of widening the flat wire wound in overlapping relation to form two in-slot wire parts, in the third step, a pair of first chuck claws that hold one of a pair of in-slot wire parts and a pair of second chuck claws that hold the other in-slot wire part are held to be separately rotatable about a central shaft, and the first chuck claws are rotated clockwise and the second chuck claws are rotated counterclockwise.
(4) The motor production method described in (3), preferably, further includes: a fourth step of inserting the distributed winding coil in slots of the stator in an axial direction.
(5) In the motor produced by the motor production method set forth in (3) or (4), preferably, the coil has a coil end part at one end bent toward the rotor side with respect to an in-slot wire part of the stator core, the one-end coil end part is located closer to an axis of the rotor than an inner peripheral surface of the stator core, and the one-end coil end part and a coil end part at the other end are each formed of a plurality of portions of the flat wire wound flatwise in overlapping relation, the one-end coil end part is formed in a concentric semi-circular shape, and the other-end coil end part is formed in a concentric semi-circular shape.

Effects of the Invention

The following explanation will be made on the operations and advantages of the motor and the motor production method according to the present invention.
(1) The motor includes: a stator provided with a distributed winding coil formed of a flat wire and a stator core; and a rotor provided with a central shaft, wherein the coil has a coil end part at one end bent toward the rotor side with respect to an in-slot wire part of the stator core, the one-end coil end part is located closer to an axis of the rotor than an inner peripheral surface of the stator core, and the one-end coil end part and a coil end part at the other end are each formed of a plurality of portions of the flat wire wound flatwise in overlapping relation, the one-end coil end part is formed in a concentric semi-circular shape, and the other-end coil end part is formed in a concentric semi-circular shape, a pair of terminals protrude outward from both sides of the other-end coil end part formed in the concentric semi-circular shape, and the terminals are overlapped on a terminal of an adjacent coil in an axial direction of the rotor. Accordingly, when the coil is to be inserted by directing the one-end coil end part as a leading end, along the axis into slots of the stator core, the one-end coil end part passes through the inside of the inner peripheral surface of the stator core. The coil therefore can be inserted easily in the slots in an axial direction. The coil is not elastically deformed when inserted, so that a part of the coil does not protrude out of the slots due to spring back. Furthermore, the plurality of portions of the flat wire wound flatwise in overlapping relation are simultaneously bent as being held in a lap winding state. This can simplify the producing process and reduce costs.
(2) In the motor described in (1), in the one-end coil end part, the portions of the flat wire placed in adjacent slots are overlapped one on another in a radial direction of the rotor, and in the other-end coil end part, the portions of the flat wire placed in adjacent slots are overlapped one on another in an axial direction of the rotor. Accordingly, the coil end part does not need to be deformed in the axial direction to avoid interference with the wires placed in adjacent slots. Since extra deformation is not needed, the producing process can be simplified, resulting in cost reduction.
(3) In a motor production method for a motor including: a stator provided with a distributed winding coil formed of a flat wire and a stator coil; and a rotor provided with a central shaft, there are included: a first step of winding the flat wire in overlapping relation by placing flatwise portions of the flat wire in contact with each other; a second step of bending a coil end part at one end of the distributed winding coil toward the rotor side with respect to an in-slot wire part, and a third step of widening the flat wire wound in overlapping relation to form two in-slot wire parts, in the third step, a pair of first chuck claws that hold one of a pair of in-slot wire parts and a pair of second chuck claws that hold the other in-slot wire part are held to be separately rotatable about a central shaft, and the first chuck claws are rotated clockwise and the second chuck claws are rotated counterclockwise; and a fourth step of inserting the distributed winding coil in slots of the stator in an axial direction. Accordingly, it is possible to easily form the bent parts as well as the wire portions to be inserted in two slots.

DETAILED DESCRIPTION

A detailed description of a preferred embodiment of a motor and a motor production method embodying the present invention will now be given referring to the accompanying drawings.

Figure 1:
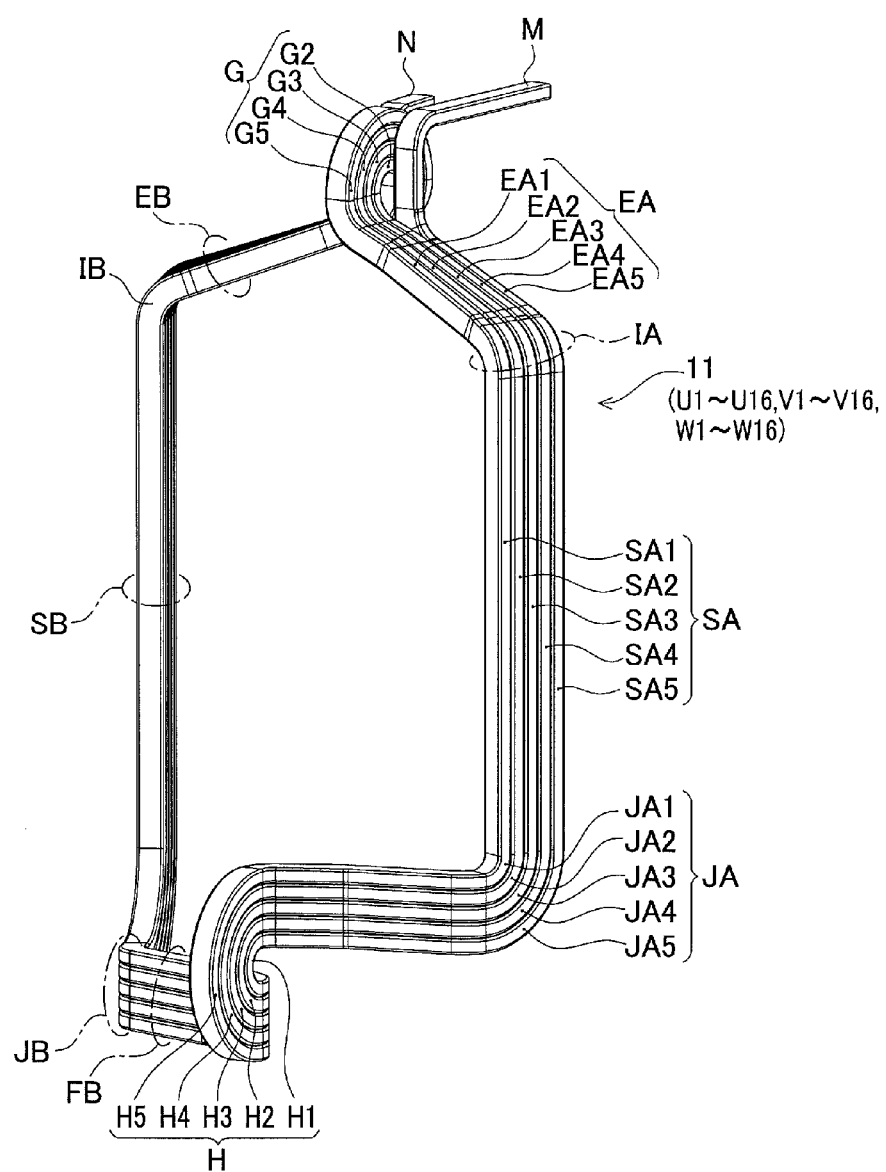
FIG. 1 is a perspective view of a base unit.
Figure 2:
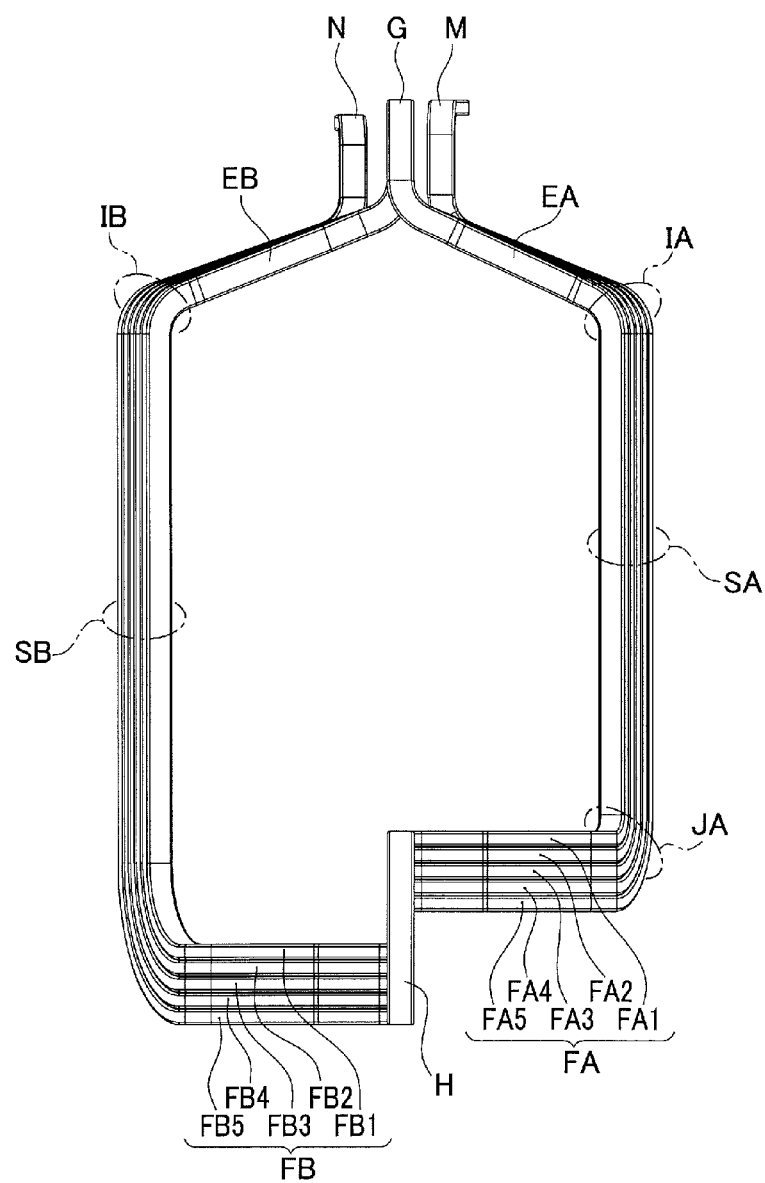
FIG. 2 is a front view of the base unit.
Figure 3:
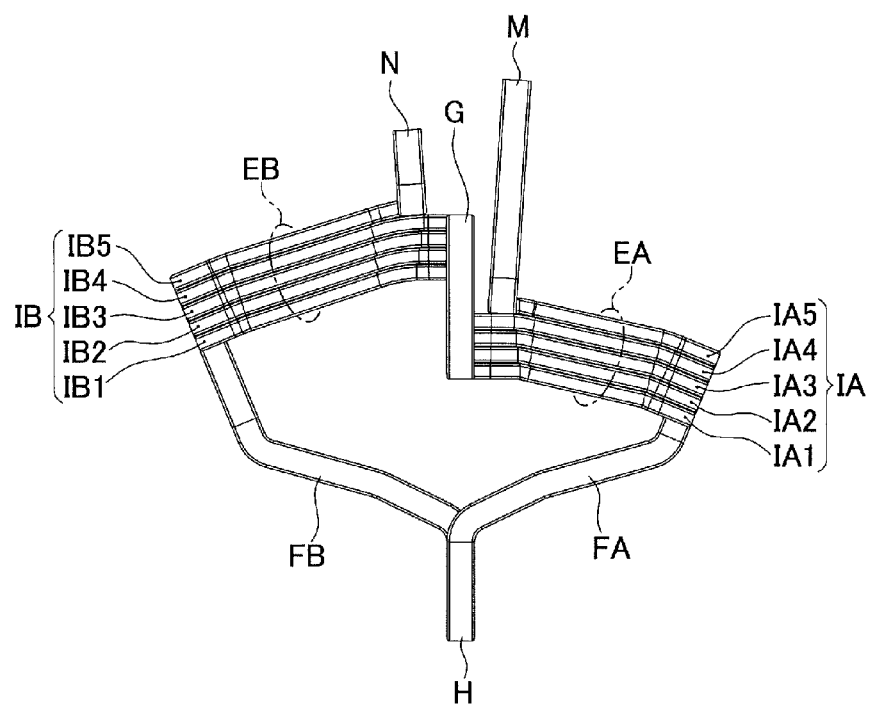
FIG. 3 is a plan view of the base unit.
Figure 4:
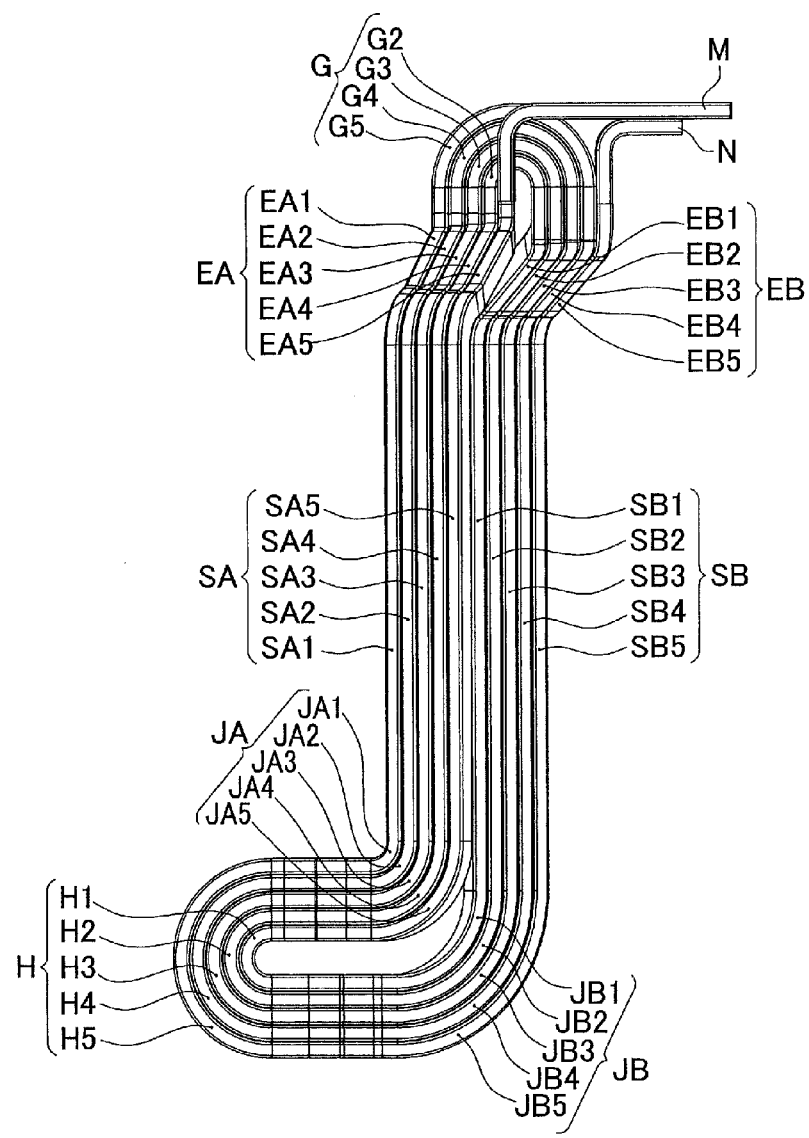
FIG. 4 is a right side view of the base unit.

FIG. 1 is a perspective view of a base unit 11 formed of a flat wire with five flat wire portions simultaneously shaped. FIG. 2 is a front view of the base unit 11 of FIG. 1. FIG. 3 is a plan view seen from above in FIG. 1. FIG. 4 is a right side view of FIG. 1.

The base unit 11 includes an in-slot wire portion (section) SA and an in-slot wire portion (section) SB, which are to be placed in slots.

As shown in FIG. 1, the in-slot wire part SA is provided by overlapping five flat wire portions one on another so that respective long-side surfaces (flatwise surfaces) are in contact with each other. This wire part SA is an assembly of a first in-slot wire portion SA1, a second in-slot wire portion SA2, a third in-slot wire portion SA3, a fourth in-slot wire portion SA4, and a fifth in-slot wire portion SA5. As shown in FIG. 4, the in-slot wire part SB is provided by overlapping five flat wire portions one on another so that respective long-side surfaces (flatwise surfaces) are in contact with each other.

This wire part SB is an assembly of a first in-slot wire portion SB1, a second in-slot wire portion SB2, a third in-slot wire portion SB3, a fourth in-slot wire portion SB4, and a fifth in-slot wire portion SB5.

At the center of a coil end part located in an upper side in FIG. 1, an upper concentric part G is formed. This upper concentric part G is an assembly of four flat wire portions, i.e., a second concentric portion G2, a third concentric portion G3, a fourth concentric portion G4, and a fifth concentric portion G5, as shown in FIG. 4. The reason why a first concentric portion is not included is that an oblique portion EA5 which will be mentioned later protrudes outward as a terminal M.

A bent portion IA is formed at an upper end of the in-slot wire part SA. The flat wire portions are bent at the bent portion IA toward the upper concentric part G as shown in FIG. 2. An oblique part EA is formed between the upper concentric part G and the in-slot wire part SA. The bent portion IA is an assembly of bent portions IA1, IA2, IA3, IA4, and IA5 of the five flat wire portions as shown in FIG. 3. The oblique part EA is an assembly of oblique portions EA1, EA2, EA3, EA4, and EA5 of the five flat wire portions as shown in FIGS. 1 and 4.

In the oblique part EA, the five flat wire portions are overlapped one on another in a radial direction (right-and-left direction in FIG. 4) as with the in-slot wire part SA as shown in FIG. 4.

A bent portion IB is formed at an upper end of the in-slot wire part SB. The flat wire portions are bent at the bent portion IB toward the upper concentric part G as shown in FIG. 2. An oblique part EB is formed between the upper concentric part G and the in-slot wire part SB. The bent portion IB is an assembly of bent portions IB1, IB2, IB3, IB4, and IB5 of the five flat wire portions as shown in FIG. 3. The oblique part EB is an assembly of oblique portions EB1, EB2, EB3, EB4, and EB5 of the five flat wire portions as shown in FIG. 4.

In the oblique part EB, the five flat wire portions are overlapped one on another in the radial direction (right-and-left direction in FIG. 4) as with the in-slot wire part SB as shown in FIG. 4.

As shown in FIG. 4, the terminal M of EA5 located in an innermost circumferential position of the oblique part EA is bent to protrude outward. A terminal N of EB5 located in an outermost circumferential position of the oblique part EB is bent to protrude outward.

A bent part JA is formed at a lower end of the in-slot wire part SA. As shown in FIG. 4, the flat wire portions are bent, at the bent part JA, by 90 degrees to inward (in a left direction in the figure). The bent part JA is an assembly of bent portions JA1, JA2, JA3, JA4, and JA5 of the five flat wire portions as shown in FIG. 4.

A bent part JB is formed at a lower end of the in-slot wire part SB. As shown in FIG. 4, the flat wire portions are bent, at the bent part JB, by 90 degrees inward (in the left direction in the figure). This is an assembly of bent portions JB1, JB2, JB3, JB4, and JB5 of the five flat wire portions as shown in FIG. 4.

A lower concentric part H is formed in a leading end on the inner circumferential side. As shown in FIG. 2, a horizontal part FA is formed between the bent part JA and the lower concentric part H. A horizontal part FB is formed between the bent part JB and the lower concentric part H.

The lower concentric part H is an assembly of lower concentric portions H1, H2, H3, H4, and H5 of the five flat wire portions as shown in FIG. 4.

The horizontal part FA is an assembly of horizontal portions FA1, FA2, FA3, FA4, and FA5 of the five flat wire portions as shown in FIG. 2. Herein, in the horizontal part FA, the horizontal portions of the five flat wire portions are overlapped one on another in the axial direction (up-and-down direction in FIG. 2) as shown in FIG. 2.

The horizontal part FB is an assembly of horizontal portions FB1, FB2, FB3, FB4, and FB5 of the five flat wire portions as shown in FIG. 2. Herein, in the horizontal part FB, the horizontal portions of the five flat wire portions are overlapped one on another in the axial direction (up-and-down direction in FIG. 2) as shown in FIG. 2.

A method of producing the base unit 11 will be explained below. This production method of the base unit 11 includes a winding step, a bending step, and a widening step.

Figure 5:
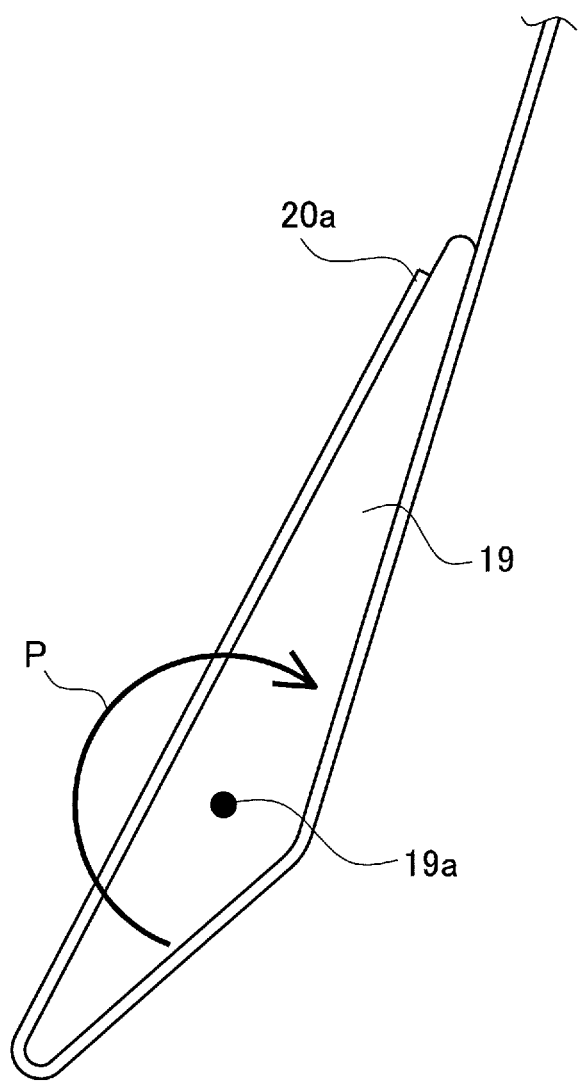
FIG. 5 is a diagram showing a winding step of a process of producing the base unit.

FIG. 5 shows the winding step in a producing process of the base unit 11. A die 19 having a flat triangular cross section is provided to be rotatable about a central shaft 19a. An end 20a of a flat rectangular wire ("flat wire") 20 is fixed on the die 19, and then the die 19 is rotated about the central shaft 19a in a direction indicated by an arrow P to wind the flat wire 20 by five turns around the die 19. At that time, the flat wire 20 is wound flatwise in overlapping relation. To be concrete, a flat wire having a rectangular cross section of about 1 mm×about 10 mm is wound so that respective about—10-mm long sides are overlapped one on another.

Figure 6:
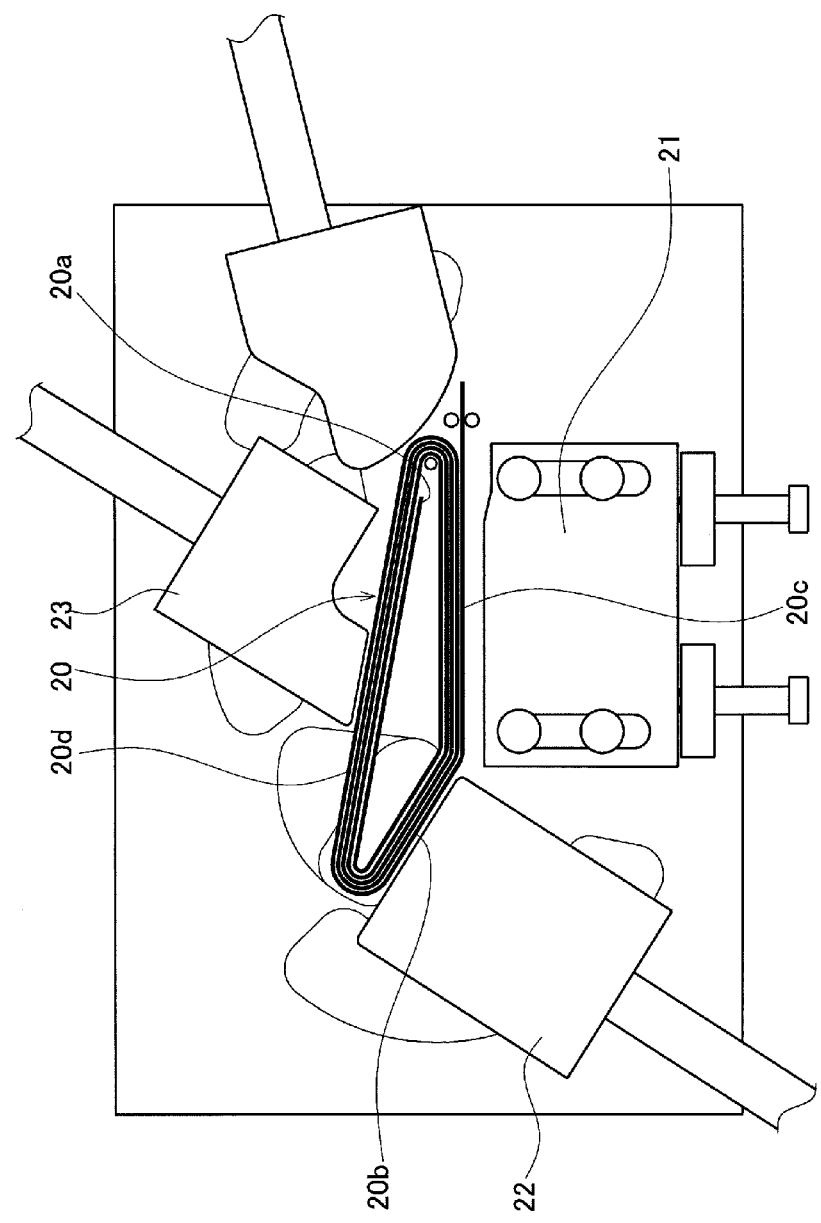
FIG. 6 is a first view showing a bending step of the base unit producing process.
Figure 7:
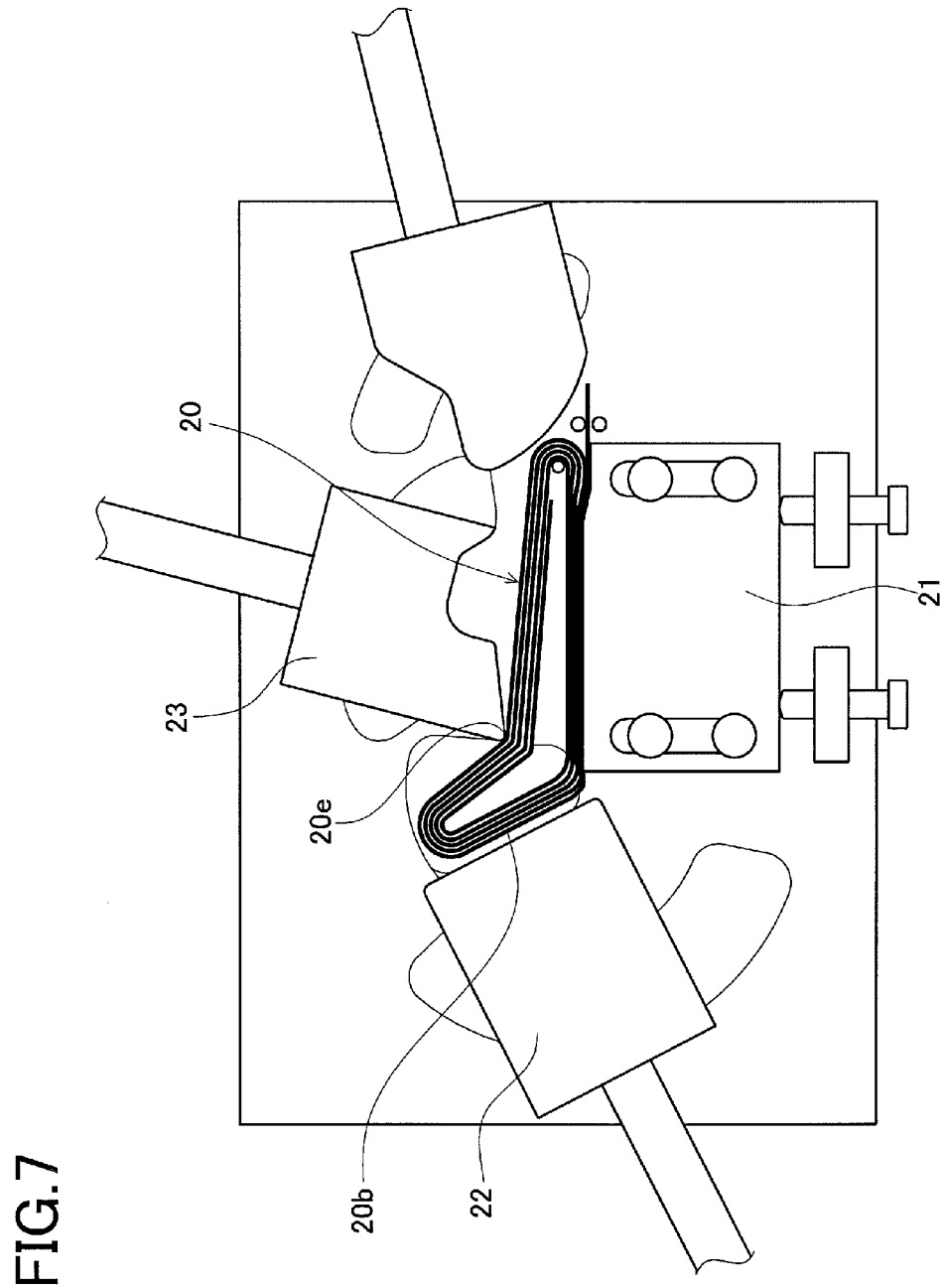
FIG. 7 is a second view showing the bending step of the base unit producing process.
Figure 8:
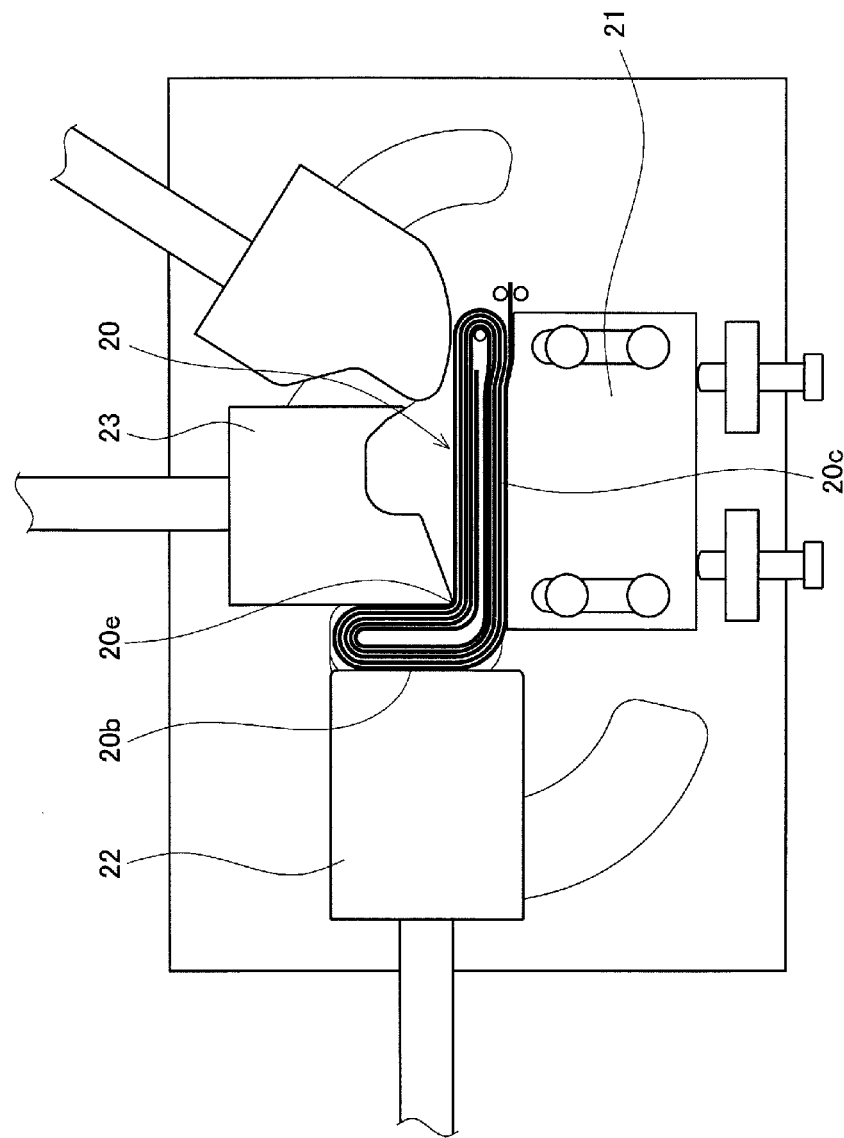
FIG. 8 is a third view showing the bending step of the base unit producing process.

The bending step is explained below. FIG. 6 shows a first stage of the bending step in the producing process of the base unit 11. FIG. 7 shows a second stage and FIG. 8 shows a third stage. In the winding step, the flat wire 20 wound by five turns is detached from the die 19 and placed in a position shown in FIG. 6. In this state, a short side 20b which is shortest in the flat wire 20 wound in a triangular form is in contact with a jig 22. A jig 21 is placed in parallel to the entire length of a middle side 2 which is second short. A jig 23 is placed near the center of a long side 20d which is longest.

Successively, the jig 21 is translated up to the position where the jig 21 contacts the middle side 20c as shown in FIG. 7. Simultaneously, the jig 23 is brought into contact with a bent portion 20e of the long side 20d. At the same time, the jig 22 rotates the short side 20d clockwise to bend the flat wire 20 at the bent portion 20e.

The flat wire 20 is bent until the middle side 20c and the short side 20b make a right angle (90 degrees) as shown in FIG. 8.

Figure 9:
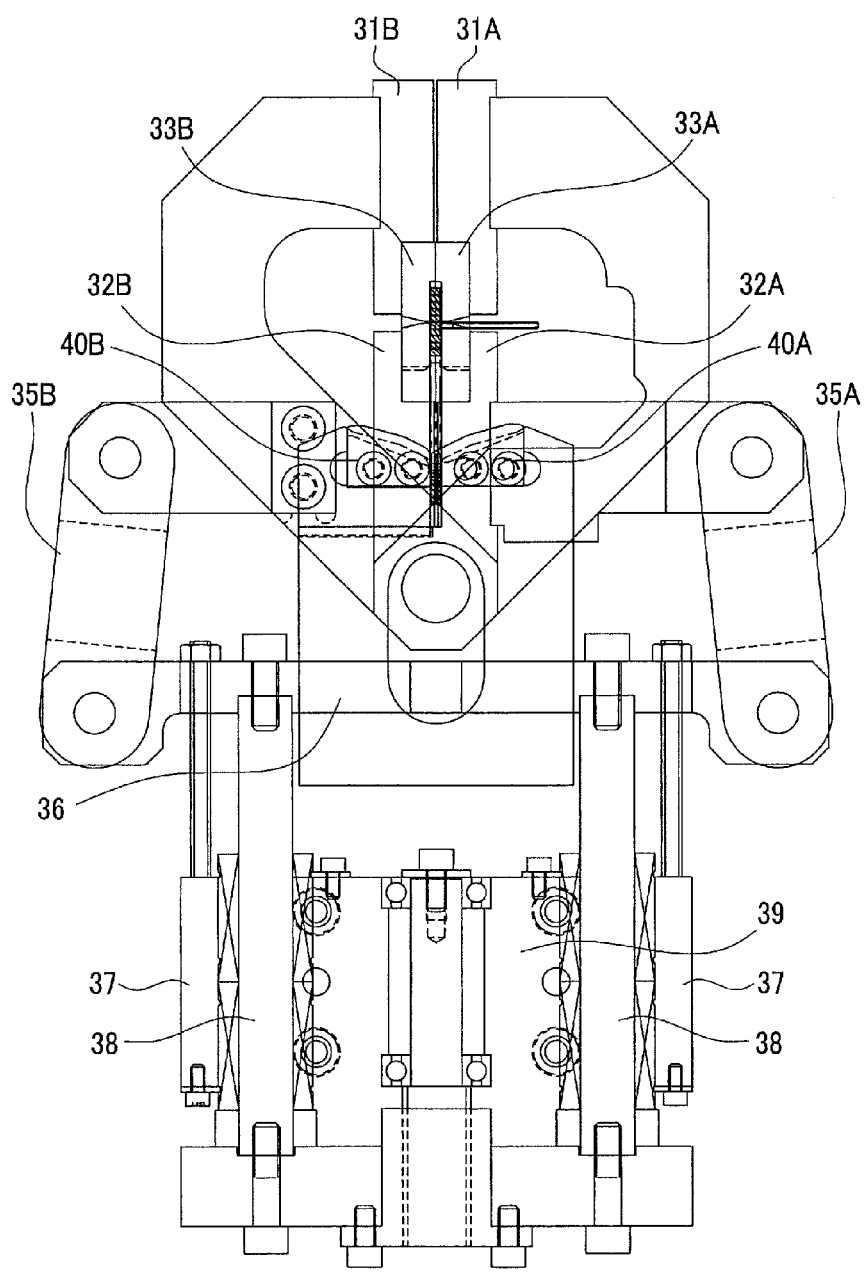
FIG. 9 is a first view showing a widening step of the base unit producing process.
Figure 10:
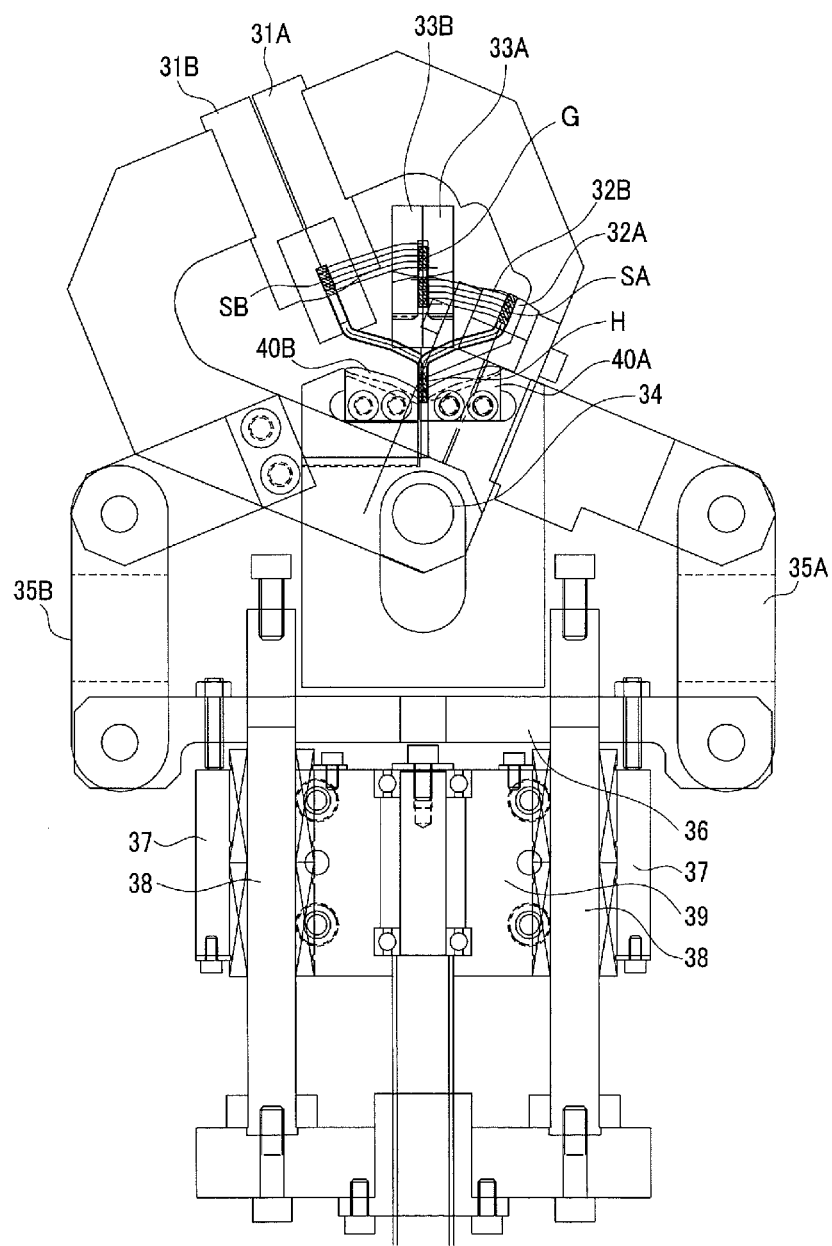
FIG. 10 is a second view showing the widening step of the base unit producing process.

The widening step is explained below. FIG. 9 shows a first view of the widening step in the producing process of the base unit 11. FIG. 10 shows a second view of the widening step and FIG. 11 is a side view of FIG. 9.

Figure 11:
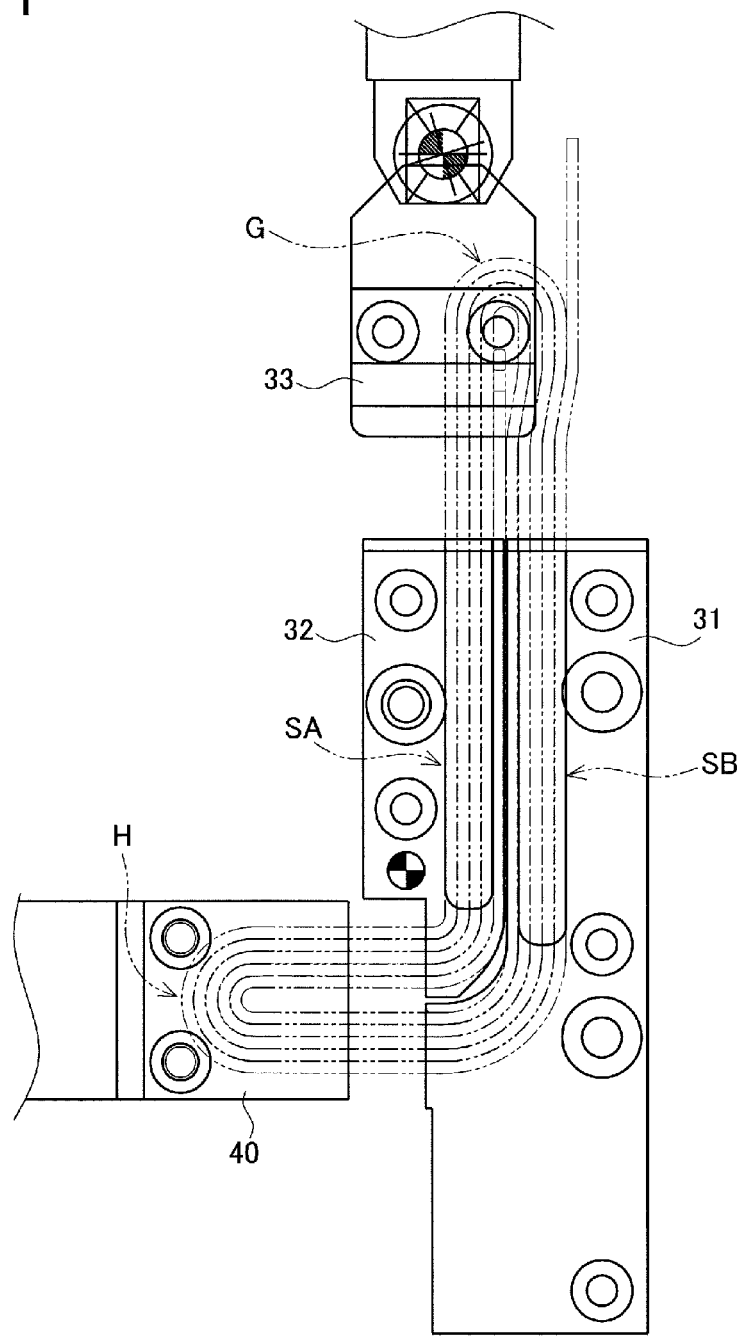
FIG. 11 is a third view showing the widening step of the base unit producing process.

As shown in FIGS. 9 and 11, the upper concentric part G (five portions of the flat wire ("five flat wire portions")) is clamped by a pair of chuck claws 33 (33A and 33B). The lower concentric part H (five flat wire portions) is fixed by a pair of guide claws 40 (40A and 40B). The in-slot wire part SA (five flat wire portions) is clamped by a pair of chuck claws 32 (32A and 32B). The in-slot wire part SB (five flat wire portions) is clamped by a pair of chuck claws 31 (31A and 31B).

Herein, the pair of chuck claws 32 (32A and 32B) and the pair of chuck claws 31 (31A and 31B) are individually held to be rotatable about a central shaft 34. A base plate 36 is fixed to distal ends of two guide rods 38. These guide rods 38 are slidably supported by a stationary part 39 fixedly located. Main parts of a pair of air cylinders 37 are fixedly provided on both sides of the holding part 39. Furthermore, a rod end of each of the air cylinders 37 is connected to the base plate 36. By activation of the air cylinders 37, the guide rods 38 and the base plate 36 are caused to slide with respect to the holding part 39. The base plate 36 is additionally provided with a pair of link mechanism 35A and 35B. The link mechanism 35A is connected to a base plate of the chuck claw 32 and the link mechanism 35B is connected to a base plate of the chuck claw 31.

While the above parts separately clamp the flat wire 20 as shown in FIG. 9, the air cylinders 37 are driven. Accordingly, the base plate 36 is slid up to the position shown in FIG. 10, at which the pair of chuck claws 32 (32A and 32B) holding the in-slot wire part SA is rotated clockwise in FIG. 10, thereby plastically deforming the in-slot wire part SA to a predetermined clockwise position with respect to the upper concentric part G and the lower concentric part H. Simultaneously, the pair of chuck claws 31 (31A and 31B) holding the in-slot wire part SB is rotated counterclockwise in FIG. 10, thereby plastically deforming the in-slot wire part SB to a predetermined counterclockwise position with respect to the upper concentric part G and the lower concentric part H.

Subsequently, the terminal M and the terminal N are bent to be plastically deformed. As above, the base unit 11 is completed.

Figure 12:
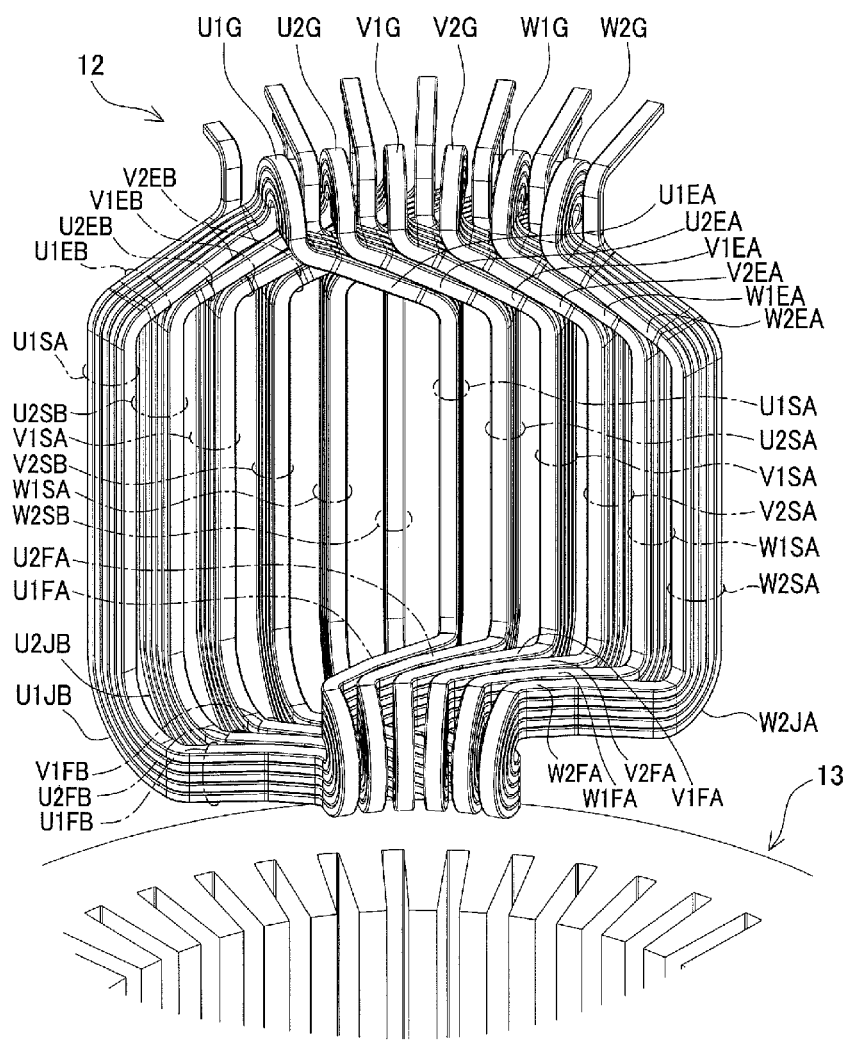
FIG. 12 is a first view showing an inserting step to insert the base unit in a stator core.

Next, a plurality of the produced base units are assembled together in overlapping manner. FIG. 12 is a perspective view showing a state where six base units 11, i.e., a U-phase first base unit U1, a U-phase second base unit U2, a V-phase first base unit V1, a V-phase second base unit V2, a W-phase first base unit W1, and a W-phase second base unit W2 are assembled together. The in-slot wire portions of the first base unit and the second base unit are inserted in both sides of one teeth part, so that six base units 11 are assumed as one unit. It is to be noted that portions forming the U-phase base units are given signs beginning with an alphabet "U". The same applies to portions forming the V-phase base units and the W-wire base units.

In the oblique parts U1EB, U2EB, V1EB, V2EB, W1EB, and W2EB of the base units U1, U2, V1, V2, W1, and W2, five flat wire portions (EB1 to EB5) are overlapped in the radiation direction of the stator core 13 (rotor).

The oblique part U2EB of the U-phase second base unit U2 is overlapped on the lower side of the oblique part U1EB of the U-phase first base unit in the axial direction (toward the stator core 13). Similarly, the oblique part V1EB of the V-phase first base unit V1 is overlapped on the lower side of the oblique part U2EB of the U-phase second base unit U2 in the axial direction.

Specifically, in the base units U1, U2, V1, V2, W1, and W2 to be placed in adjacent slots, the oblique parts U1EB, U2EB, V1EB, V2EB, W1EB, and W2EB are located sequentially clockwise to overlap under an immediately previous one of the oblique parts EB in the axial direction.

In the oblique parts U1EA, U2EA, V1EA, V2EA, W1EA, and W2EA of the base units U1, U2, V1, V2, W1, and W2, five flat wire portions (EA1 to EA5) are overlapped in the radial direction of the stator core 13 (rotor).

The oblique part U2EA of the U-phase second base unit U2 is overlapped on the upper side of the oblique part U1EA of the U-phase first base unit in the axial direction (opposite direction to the stator core 13). Similarly, the oblique part V1EA of the V-phase first base unit V1 is overlapped on the upper side of the oblique part U2EA of the U-phase second base unit U2 in the axial direction.

Specifically, in the base units U1, U2, V1, V2, W1, and W2 to be placed in adjacent slots, the oblique parts U1EA, U2EA, V1EA, V2EA, W1EA, and W2EA are located sequentially clockwise to overlap the upper side of an immediately previous one of the oblique parts EA in the axial direction.

In the horizontal parts U1FB, U2FB, V1FB, V2FB, W1FB, and W2FB of the base units U1, U2, V1, V2, W1, and W2, five flat wire portions (FB1 to FB5) are overlapped in the axial direction of the stator core 13 (rotor).

The horizontal part U2FB of the U-phase second base unit U2 is located o overlap the horizontal part U1FB of the U-phase first base unit U1 clockwise in an outer circumferential position in the radial direction. The horizontal part V1FB of the V-phase base unit V1 is located to overlap the horizontal part U2FB of the U-phase second base unit U2 clockwise in an outer circumferential position in the radial direction.

Specifically, as shown in FIG. 12, in the base units U1, U2, V1, V2, W1, and W2 to be placed in adjacent slots, the horizontal parts U1FB, U2FB, V1FB, V2FB, W1FB, and W2FB are located to overlap an immediately adjacent one of the horizontal parts FB clockwise in the outer circumferential position in the radial direction of the horizontal part FB.

In the horizontal parts U1FA, U2FA, V1FA, V2FA, W1FA, and W2FA of the base units U1, U2, V1, V2, W1, and W2, five flat wire portions (FA1 to FA5) are overlapped in the axial direction of the stator core 13 (rotor).

The horizontal part U2FA of the U-phase second base unit U2 is located to overlap the horizontal part U1FA of the U-phase first base unit U1 clockwise in an inner circumferential position in the radial direction. The horizontal part V1Fa of the V-phase base unit V1 is located to overlap the horizontal part U2FA of the U-phase second base unit U2 clockwise in the inner circumferential position in the radial direction.

Specifically, in the base units U1, U2, V1, V2, W1, and W2 to be placed in adjacent slots as shown in FIG. 12, the horizontal parts U1FA, U2Fa, V1FA, V2FA, W1FA, and W2FA are located to overlap sequentially an immediately adjacent one of the horizontal parts FA clockwise in the inner circumferential position in the radial direction.

The upper concentric parts U1G, U2G, V1G, V2G, W1G, and W2G are arranged sequentially in the circumferential direction. The lower concentric parts U1H, U2H, V1H, V2H, W1H, and W2H are arranged sequentially in the circumferential direction.

When twenty-four base units 11 are overlapped one on another, a semi-circular assembly is formed. Two sets of the assemblies are produced and assembled together, so that a circular basket or cage coil 12 consisting of forty-eight overlapped base units 11 is completed.

Figure 13:
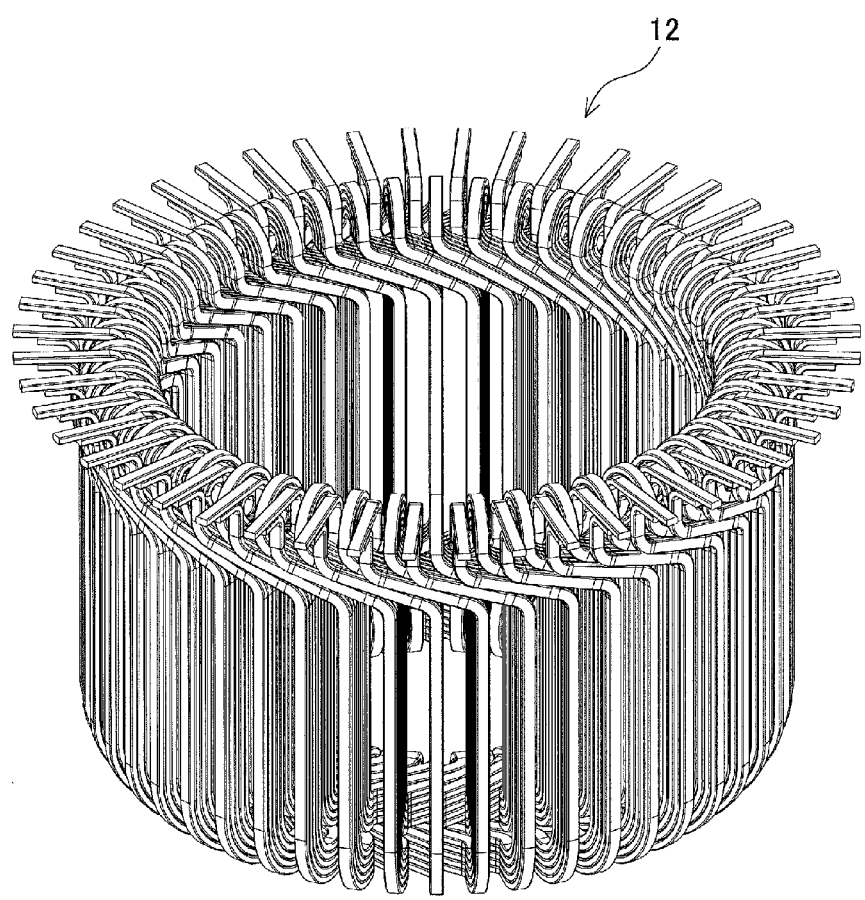
FIG. 13 is a view showing an entire basket coil.
Figure 14:
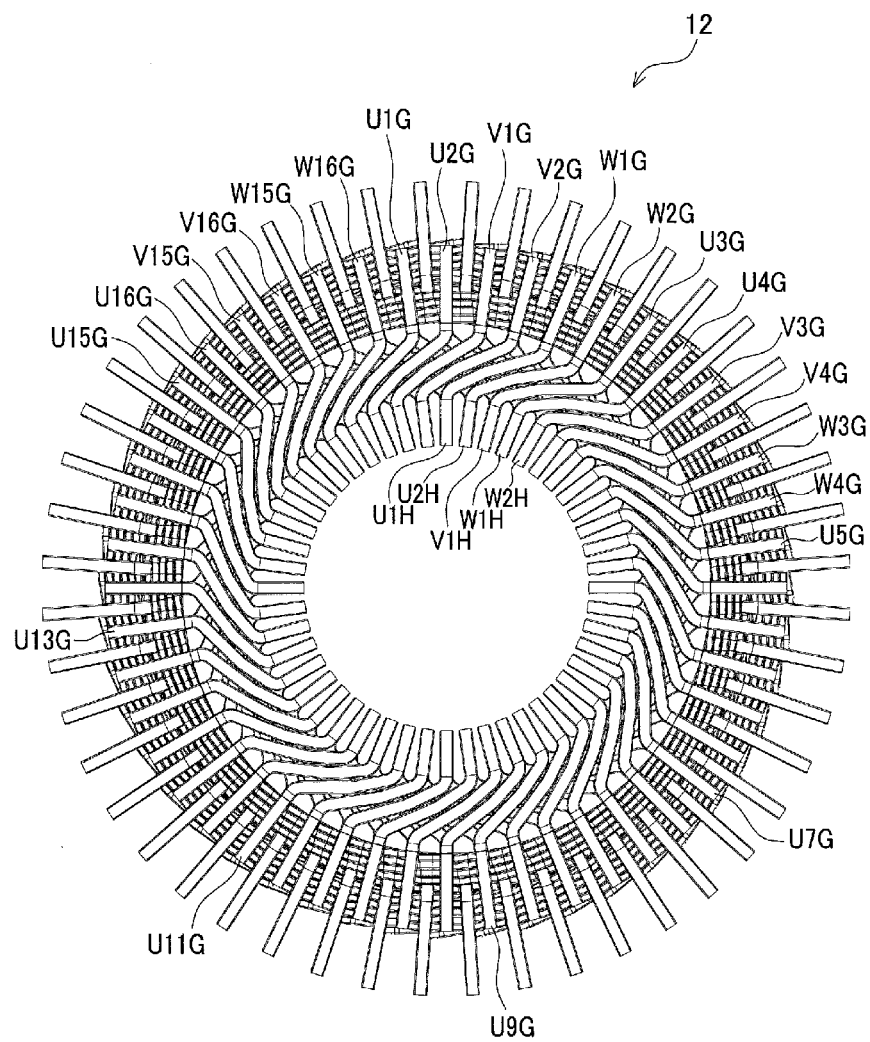
FIG. 14 is a plan view showing the entire basket coil.
Figure 15:
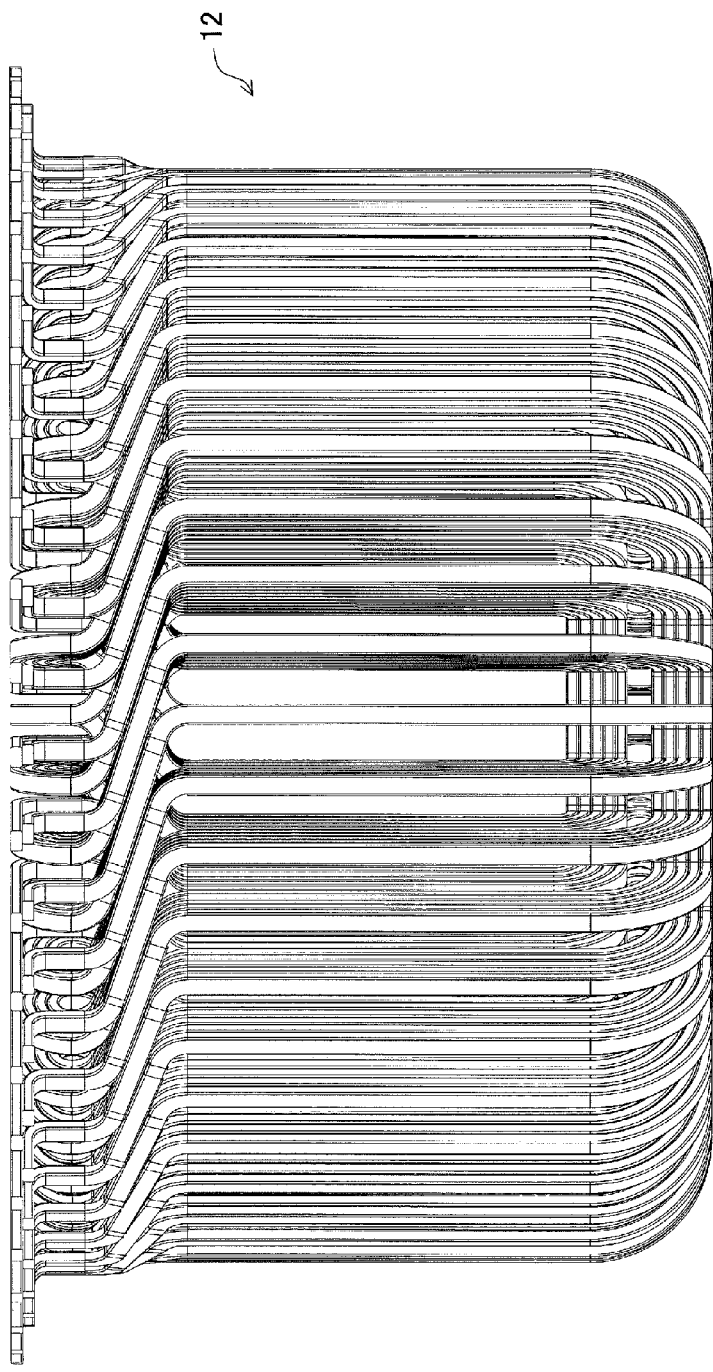
FIG. 15 is a front view of the basket coil.

FIG. 13 is a perspective view showing a configuration of the basket coil 12 including forty-eight base units 11 overlapped one on another. FIG. 14 is a plan view of the basket coil 12 (seen from above in FIG. 13). FIG. 15 is a front view of the basket coil 12. The stator core of a stator of a motor of the present embodiment has forty-eight slots and forty-eight teeth parts.

Each of the base units 11 includes two in-slot wire parts SA and SB that are placed, as shown in FIG. 4, with displacement by the total thickness of five flat wire portions in the radial direction (up-and-down direction in FIG. 4).

As shown in FIG. 14, the U-phase first base unit U1, the U-phase second base unit U2, the V-phase first base unit V1, the V-phase second base unit V2, the W-phase first base unit W1, and the W-phase second base unit W2 are sequentially overlapped one on another. Subsequently, sequentially overlapping two base units of the U phase, two base units of the V phase, and two base units of the W phase is repeated, and terminated by the U-phase fifteenth base unit U15, U-phase sixteenth base unit U16, V-phase fifteenth base unit V15, V-phase sixteenth base unit V16, W-phase fifteenth base unit W15, and W-phase sixteenth base unit W16. Since each of three phases, i.e., the U phase, the V phase, and the W phase, includes sixteenth base units 11, a total of forty-eight base units 11 are arranged. In each slot, two sets of five flat wire portions (ten flat wire portions in total), each set consisting of five flat wire portions, are inserted.

Figure 16:
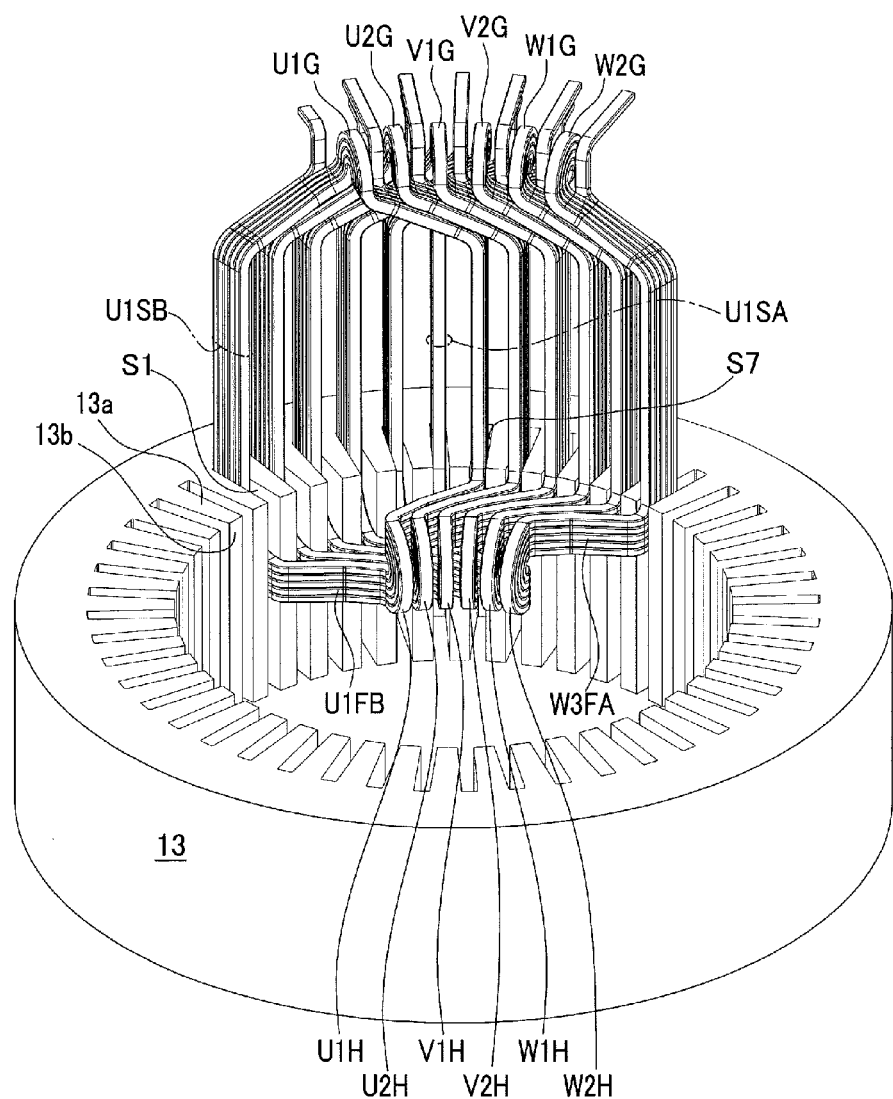
FIG. 16 is a first view showing the inserting step to insert the base unit in the stator core.

A method of inserting the basket coil 12 in the stator core 13 will be explained below. FIG. 16 shows a state where a lower part of the basket coil 12 is about half inserted in the stator core 13. FIG. 16 shows only six sets of the base units U1, U2, V1, V2, W1, and W2 (the same as shown in FIG. 12) which is a part of the basket coil 12 to avoid difficulty in understanding, instead of illustrating the entire basket coil 12. The following explanation is given to an inserting operation of six sets of base units U1, U2, V1, V2, W1, and W2 which are a part of the basket coil 12; however, the same inserting operation explained below applies to the entire basket coil 12. Furthermore, although an insulator is not illustrated, the insulator is preferably mounted in each slot S of the stator core 13 before the basket coil 12 is inserted in the stator core 13.

As shown in FIG. 16, the lower concentric parts U1H, U2H, V1H, V2H, W1H, and W2H, the horizontal parts U1FB, U2FB, V1FB, V2FB, W1FB, and W2FB, and the horizontal parts U1FA, U2FA, V1FA, V2FA, W1FA, and W2FA are located more inside toward the center line of the stator core 13 than the inner peripheral surface 13b of the ends of the teeth parts 13a.

Accordingly, when the in-slot wire parts U1SB, U2SB, V1SB, V2SB, W1SB, and W2SB, and the in-slot wire parts U1SA, U2SA, V1SA, V2SA, W1SA, and W2SA are to be inserted downward from above in the axial direction along the central axis of the stator core 13 in FIG. 16 into first slot S1 to twelfth slot S12, respectively, the lower concentric parts H, the horizontal parts FB, and the horizontal parts FA do not interfere with the stator core 13. Thus, the basket coil 12 can be inserted in the slots S of the stator core 13.

Herein, for example, the in-slot wire part U1SB (five in-slot wire portions SB1 to SB5) of the U-phase first base unit U1 is inserted on an outer circumferential side (a back or depth side) in the first slot S1. The other in-slot wire part U1SA (five in-slot wire portions SA1 to SA5) is inserted on an inner circumferential side (a front or shallow side) in the seventh slot S7.

On the inner circumferential side in the first slot S1, the in-slot wire part U16SB (five in-slot wire portions SB1 to SB5) of a U-phase sixteenth base unit U16 not shown is inserted. Accordingly, a total of ten flat wire portions of the in-slot wire part U1SA and the in-slot wire part U16SB are inserted in the first slot.

Similarly, on the outer circumferential side in the seventh slot S7, the in-slot wire part U3SB (five in-slot wire portions SB1 to SB5) of a U-phase third base unit U3 not shown is inserted. Accordingly, a total of ten flat wire portions of the in-slot wire part U1SA (SA1 to SA5) and the in-slot wire part U3SB (SB1 to SB5) are inserted in the seventh slot.

Figure 17:
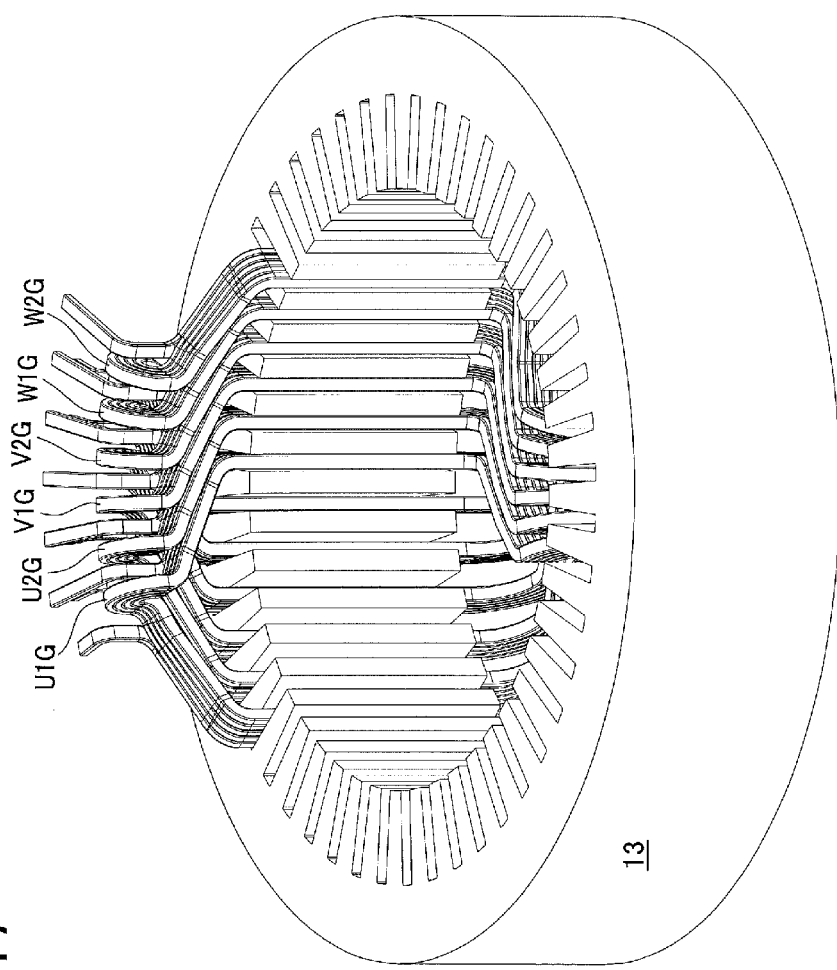
FIG. 17 is a second view showing the inserting step to insert the base unit in the stator core.
Figure 18:
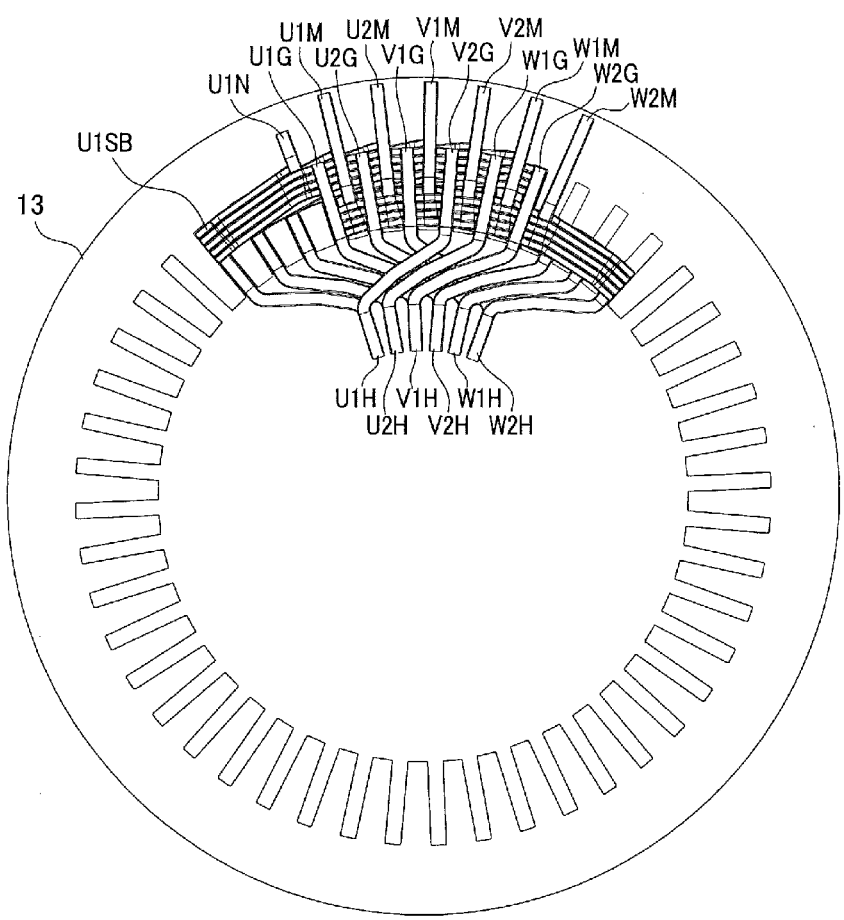
FIG. 18 is a third view showing the inserting step to insert the base unit in the stator core.
Figure 19:
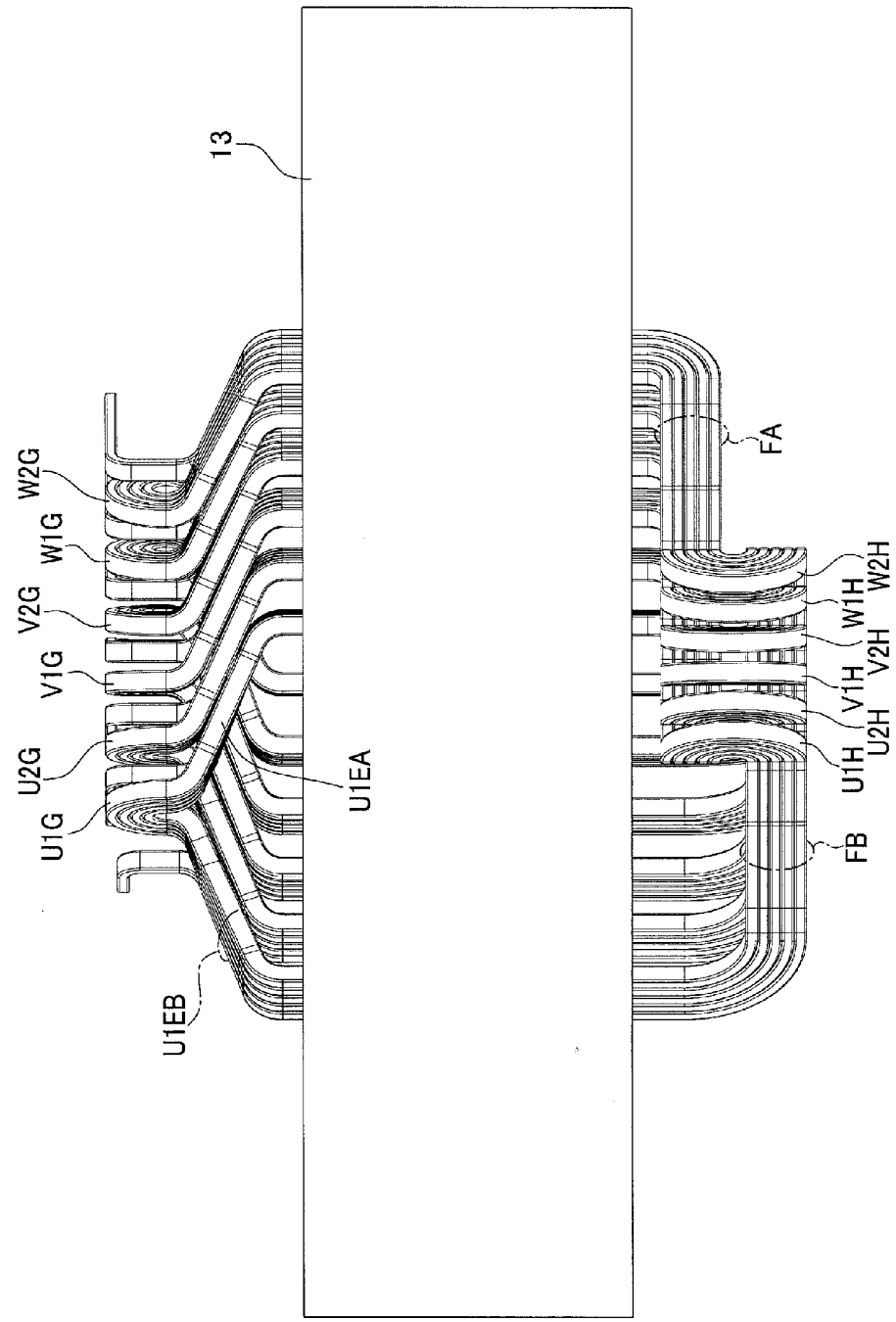
FIG. 19 is a fourth view showing the inserting step to insert the base unit in the stator core.

FIG. 17 shows a state where the basket coil 12 is inserted up to a predetermined position in the stator core 13. FIG. 18 is a plan view of the stator core 13 axially seen from above in FIG. 17. FIG. 19 is a front view of FIG. 18. In FIG. 18, the terminals N are located below the terminals M and thus invisible, but the terminal U1N is visible in FIG. 18 because the terminal U16M is omitted.

As shown in FIG. 19, the positions of each lower concentric part H, horizontal part FB, and horizontal part FA are spaced from the end face of the stator core 13. This is to avoid electromagnetic influence with the rotor. When the basket coil 12 is inserted to the position shown in FIG. 17, even though FIG. 17 shows only a part of the basket coil 12, assembly of the basket coil 12 with the stator core 13 is completed. Thereafter, resin having good heat conductivity is injected in spaces or voids in the slots S in which the in-slot wire parts SA and SB have been inserted. Furthermore, the terminals M and N of each of the U phase, the V phase, and the W phase are sequentially connected by bas bars. In this way, a stator 10 is completed.

Figure 20:
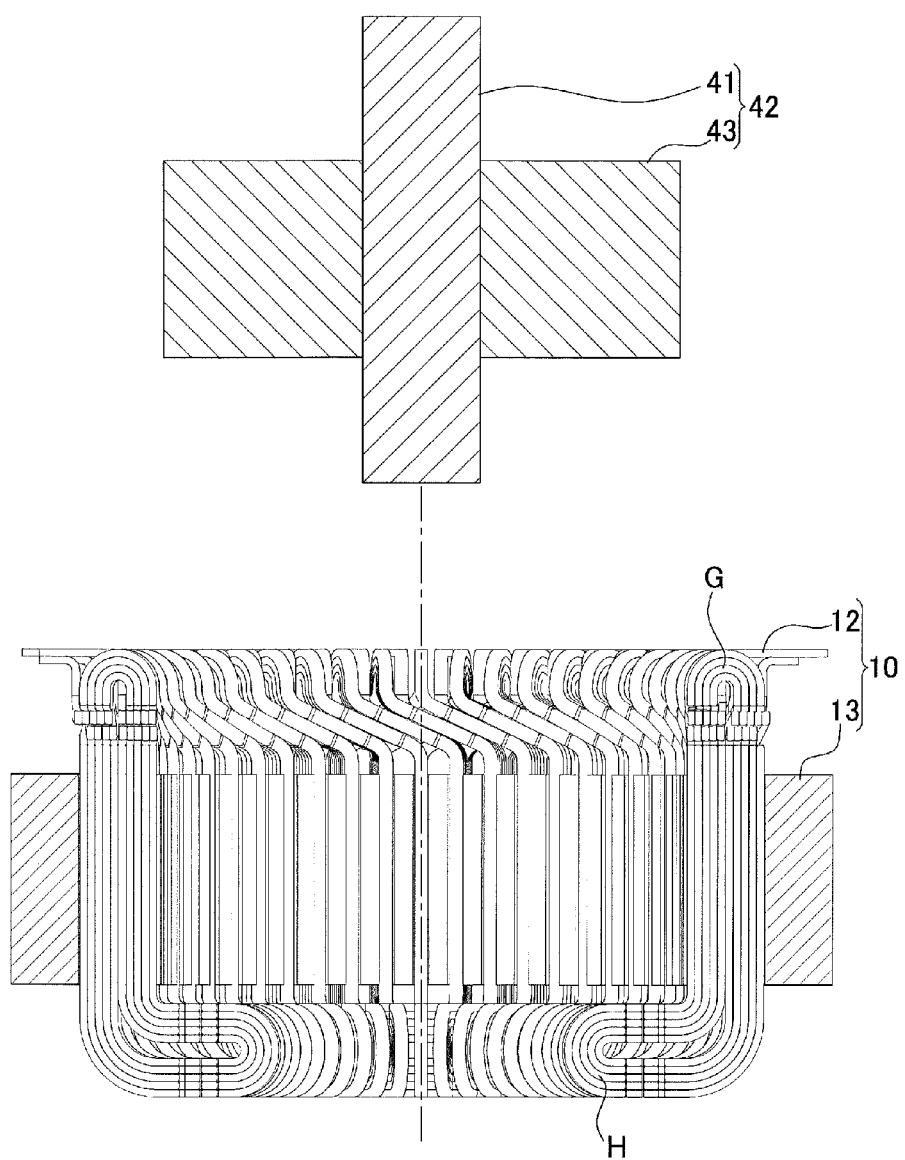
FIG. 20 is a first view showing an inserting step to insert a rotor in a stator.

A method of mounting a rotor 42 of a motor in the completed stator 10 will be explained below. FIG. 20 is a central cross sectional view of the stator 10. The basket coil 12 is mounted in the stator core 13. In this state, in an upper side of the stator 10 in FIG. 20, the basket coil 12 is not present more inside than the inner peripheral surface 13b of the teeth part 13a of the stator core 13. On the other hand, in a lower side of the stator 10 in FIG. 20, the lower concentric part H, horizontal part FA, and horizontal part FB, which are bent parts of the basket coil 12, are located more inside than the inner peripheral surface of the teeth of the stator core 13.

Figure 21:
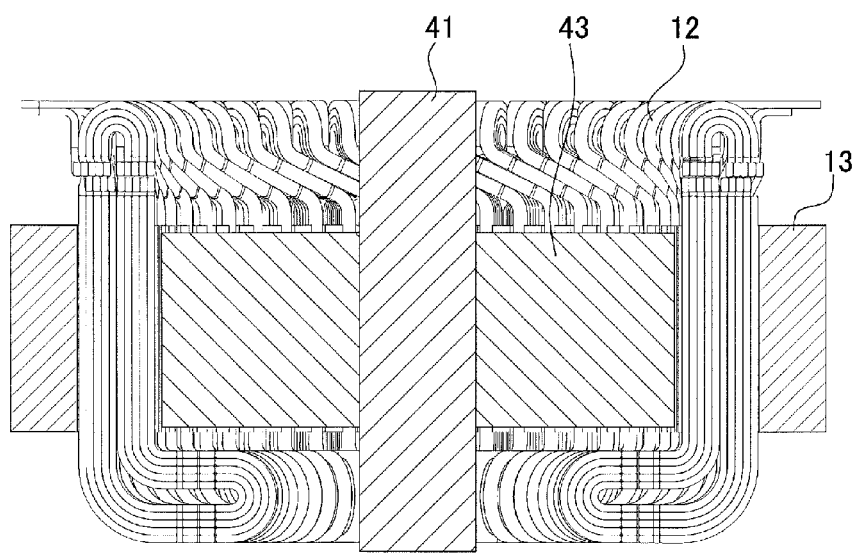
FIG. 21 is a second view showing the inserting step to insert the rotor in the stator.

On the other hand, the rotor 42 of the motor includes a rotor part 43 on the outer periphery of a central shaft 41. The rotor 42 cannot be inserted from below the stator 10, but can be inserted from above the stator 10 along its axis. FIG. 21 shows a state where the rotor 42 has been inserted in the stator 10. The central shaft 41 of the rotor 42 protrudes out of a center hole formed by the inner peripheral surface of the lower concentric part H of the basket coil 12 as shown in FIG. 21.

According to the motor of the present embodiment, as explained in detail above, in the motor including the stator 10 provided with the basket coil 12, which is a distributed winding coil made of the flat wire and the stator core 13, and the rotor 42 provided with the central shaft 41, the coil end part at one end ("one-end coil end part") of the basket coil 12 includes the bent parts JA and JB bent toward the rotor side relative to the in-slot wire parts SA and SB of the stator core. The concentric part H, horizontal part FA, horizontal part FB which form the one-end coil end part are located closer to the axis of the rotor than the inner peripheral surface 13b of the teeth part 13a. The one-end coil end part and a coil end part at the other end ("the other-end coil end part") are each made of five flat wire portions wound flatwise in overlapping relation. When the basket coil 12 is to be inserted along the axis into the slots S of the stator core 13 by directing the one-end coil end part as a leading end, the lower concentric part H, horizontal part FA, and horizontal part FB which form the one-end coil end part pass through the inside of the inner peripheral surface 13b of the teeth part 13a. The basket coil 12 can therefore be inserted easily in the slots S along the axial direction. The basket coil 12 is not elastically deformed when inserted, so that a part of the basket coil 12 does not protrude out of the slots S due to spring back. Furthermore, a plurality of portions of the flat wire wound flatwise in overlapping relation are simultaneously bent as being held in a lap winding state. This can simplify the producing process and reduce costs.

Furthermore, in the motor production method of the motor including the stator 10 provided with the distributed winding coil formed of the flat wire and the rotor 42 provided with the central shaft 41, the stator being configured such that the one-end coil end part and the other-end coil end part are each made by winding the five flat wire portions flatwise in overlapping relation, the one-end coil end part is formed in a concentric semi-circular shape (the lower concentric part H), the other-end coil end part is formed in a concentric semi-circular shape (the upper concentric part G), there are included the bending step of bending the one-end coil end part of the distributed winding coil toward the rotor 42 side with respect to the in-slot wire part and the inserting step of inserting the distributed winding coil in the slot S of the stator core 13 along the axial direction. Accordingly, the one-end coil end part of the basket coil 12 can be bent by only a simple bending work.

In the horizontal parts FA and FB of the one-end coil end part, sets of five flat wire portions to be placed in adjacent slots S are overlapped in the radial direction of the rotor. In the oblique parts EA and EB of the other-end coil end part, sets of five flat wire portions to be located in adjacent slots S are overlapped in the axial direction of the rotor. The coil end part does not need to be deformed to avoid interference with wires placed in adjacent slots S. Since extra deformation is not needed, the producing process can be simplified, resulting in cost reduction.

In the motor production method of the motor including the stator 10 provided with the distributed winding coil formed of the flat wire and the rotor 42 provided with the central shaft 41, there are included the bending step of bending the one-end coil end part of the distributed winding coil toward the rotor 42 side with respect to the in-slot wire parts SA and SB, and the inserting step of inserting the distributed winding coil along the axial direction into the slots S of the stator core 13. The method further includes the lap-winding step of winding the flat wire 20 in overlapping relation, before the bending step, by placing the flatwise portions in contact with each other. The method further includes the widening step of widening the flat wire wound by lap-winding, immediately after the bending step, so as to form two in-slot wire parts SA and SB. This makes it possible to easily form the bent parts and the in-slot wire parts SA and SB to be inserted in two slots S.

The present invention may be embodied in other specific forms without departing from the essential characteristics thereof. For instance, the above embodiment explains the motor including forty-eight slots S, but the number of slots S may be changed.

DESCRIPTION OF THE REFERENCE SIGNS

10 Stator
11 Base unit
12 Basket coil
13 Stator core
14 Center shaft
42 Rotor
43 Rotor part
Un U-phase $n^{th}$ base unit
Vn V-phase $n^{th}$ base unit
Wn W-phase $n^{th}$ base unit
G Upper concentric part
H Lower concentric part
SA, SB In-slot wire part
EA, EB Oblique part
FA, FB Horizontal part
JA, JB Bent part

The invention claimed is:

1. A motor including: a stator provided with a distributed winding coil formed of a flat wire and a stator core; and a rotor provided with a central shaft,
   wherein the coil has a coil end part at one end bent toward the rotor side with respect to an in-slot wire part of the stator core,
   the one-end coil end part is located closer to an axis of the rotor than an inner peripheral surface of the stator core, and
   the one-end coil end part and a coil end part at the other end are each formed of a plurality of portions of the flat wire wound flatwise in overlapping relation,
   the one-end coil end part is formed in a concentric semi-circle shape, and
   the other-end coil end part is formed in a concentric semi-circle shape,
   a pair of terminals protrude outward from both sides of the other-end coil end part formed in the concentric semi-circle shape, and
   the terminals are overlapped on a terminal of an adjacent coil in an axial direction of the rotor,
   in the one-end coil end part, the portions of the flat wire placed in adjacent slots are overlapped one on another in a circumferential direction of the rotor, and
   in the other-end coil end part, the portions of the flat wire placed in adjacent slots are overlapped one on another in an axial direction of the rotor.

2. A motor production method for a motor including: a stator provided with a distributed winding coil formed of a flat wire; and a stator core; and a rotor provided with a central shaft, the method including:
   a first step of winding the flat wire in overlapping relation by placing flatwise portions of the flat wire in contact with each other;
   a second step of bending a coil end part at one end of the distributed winding coil toward the rotor side with respect to an in-slot wire part, and
   a third step of widening the flat wire wound in overlapping relation to form two in-slot wire parts,
   in the third step, a pair of first chuck claws that hold one of a pair of in-slot wire parts and a pair of second chuck claws that hold the other in-slot wire part are held to be separately rotatable about a central shaft, and the first chuck claws are rotated clockwise and the second chuck claws are rotated counterclockwise such that an angle not greater than 180 degrees is formed between the in-slot wire parts.

3. The motor production method according to claim 2, further including:
   a fourth step of inserting the distributed winding coil in slots of the stator in an axial direction.

4. A motor produced by the motor production method set forth in claim 3, wherein
   the coil has a coil end part at one end bent toward the rotor side with respect to an in-slot wire part of the stator core,
   the one-end coil end part is located closer to an axis of the rotor than an inner peripheral surface of the stator core, and
   the one-end coil end part and a coil end part at the other end are each formed of a plurality of portions of the flat wire wound flatwise in overlapping relation,
   the one-end coil end part is formed in a concentric semi-circular shape, and
   the other-end coil end part is formed in a concentric semi-circular shape.

5. A motor produced by the motor production method set forth in claim 2, wherein
   the coil has a coil end part at one end bent toward the rotor side with respect to an in-slot wire part of the stator core,
   the one-end coil end part is located closer to an axis of the rotor than an inner peripheral surface of the stator core, and
   the one-end coil end part and a coil end part at the other end are each formed of a plurality of portions of the flat wire wound flatwise in overlapping relation,
   the one-end coil end part is formed in a concentric semi-circular shape, and
   the other-end coil end part is formed in a concentric semi-circular shape.

* * * * *